US012306611B1

United States Patent
Krishnamurthy et al.

(10) Patent No.: US 12,306,611 B1
(45) Date of Patent: May 20, 2025

(54) VALIDATION OF A ROBOTIC MANIPULATION EVENT BASED ON A CLASSIFIER

(71) Applicant: Amazon Technologies, Inc., Seattle, WA (US)

(72) Inventors: Harish Kashyap Krishnamurthy, Wellesley Hills, MA (US); Vikedo Terhuja, Woburn, MA (US)

(73) Assignee: Amazon Technologies, Inc., Seattle, WA (US)

(*) Notice: Subject to any disclaimer, the term of this patent is extended or adjusted under 35 U.S.C. 154(b) by 800 days.

(21) Appl. No.: 17/119,589

(22) Filed: Dec. 11, 2020

(51) Int. Cl.
| | |
|---|---|
| *B25J 9/16* | (2006.01) |
| *B25J 13/08* | (2006.01) |
| *G05B 19/4155* | (2006.01) |
| *G06N 20/00* | (2019.01) |
| *G06Q 10/0639* | (2023.01) |
| *G06Q 10/087* | (2023.01) |

(52) U.S. Cl.
CPC .......... *G05B 19/4155* (2013.01); *B25J 9/163* (2013.01); *B25J 13/085* (2013.01); *G06N 20/00* (2019.01); *G06Q 10/06395* (2013.01); *G06Q 10/087* (2013.01); *G05B 2219/40269* (2013.01)

(58) Field of Classification Search
CPC ...... G05B 19/4155; G05B 2219/40269; G05B 2219/31358; B25J 9/163; B25J 13/085; B25J 9/00; B25J 9/16; B25J 9/0081; B25J 9/1602; B25J 9/1605; B25J 9/161; B25J 9/1661; B25J 9/1669; B25J 9/1671; B25J 9/1687; G06N 20/00; G06Q 10/06395; G06Q 10/087; B05B 2219/39205
See application file for complete search history.

(56) References Cited

U.S. PATENT DOCUMENTS

| | | | |
|---|---|---|---|
| 9,669,543 B1* | 6/2017 | Stubbs | B25J 9/1612 |
| 2014/0249676 A1* | 9/2014 | Florencio | G06N 3/008 |
| | | | 700/258 |
| 2016/0354162 A1* | 12/2016 | Yen | A61B 34/20 |
| 2017/0140259 A1* | 5/2017 | Bergstra | G06N 3/044 |
| 2019/0291277 A1* | 9/2019 | Oleynik | B25J 9/1669 |
| 2020/0005096 A1* | 1/2020 | Calmon | G06N 20/10 |
| 2020/0130935 A1* | 4/2020 | Wagner | G05B 19/41 |

(Continued)

FOREIGN PATENT DOCUMENTS

| | | | |
|---|---|---|---|
| JP | 2013511739 A | * 4/2013 | |
| WO | WO-2019240330 A1 | * 12/2019 | B25J 18/00 |

*Primary Examiner* — Adam R Mott
*Assistant Examiner* — Byron Xavier Kasper
(74) *Attorney, Agent, or Firm* — Kilpatrick Townsend & Stockton LLP

(57) ABSTRACT

Techniques for validating robotic manipulation events are described. In an example, a computer system controls an action of a robotic system. The action is associated with a manipulation of an item by the robotic system. The computer system receives time-series data of a sensor. The time-series data corresponds to the manipulation of the item by the robotic system. The computer system inputs the time-series data to a classifier trained for state-based event classifications. The computer system receives, from the classifier and based at least in part on the time-series data, an output that classifies the action in an event classification from the state-based event classifications. The computer system stores the event classification of the action.

20 Claims, 9 Drawing Sheets

(56) References Cited

U.S. PATENT DOCUMENTS

| | | | |
|---|---|---|---|
| 2021/0402593 A1* | 12/2021 | Wake | G06V 40/28 |
| 2022/0105624 A1* | 4/2022 | Kalakrishnan | B25J 9/163 |
| 2022/0331962 A1* | 10/2022 | Pirk | B25J 9/161 |
| 2023/0158667 A1* | 5/2023 | Urata | B25J 9/1612 |
| | | | 700/246 |

* cited by examiner

VALIDATION OF A ROBOTIC MANIPULATION EVENT BASED ON A CLASSIFIER

BACKGROUND

Modern inventory systems, such as those in mail order warehouses, supply chain distribution centers, airport luggage systems, and custom-order manufacturing facilities, face significant challenges in responding to requests for inventory items. As inventory systems grow, the challenges of simultaneously completing a large number of packing, storing, and other inventory-related tasks become non-trivial. In inventory systems tasked with responding to large numbers of diverse inventory requests, inefficient utilization of system resources, including space, equipment, and manpower, can result in lower throughput, unacceptably long response times, an ever-increasing backlog of unfinished or incorrectly finished tasks, and, in general, poor system performance. Additionally, expanding or changing capabilities of many inventory systems requires significant changes to existing infrastructure and equipment.

BRIEF DESCRIPTION OF THE DRAWINGS

Various embodiments in accordance with the present disclosure will be described with reference to the drawings, in which.

DETAILED DESCRIPTION

Figure 1:
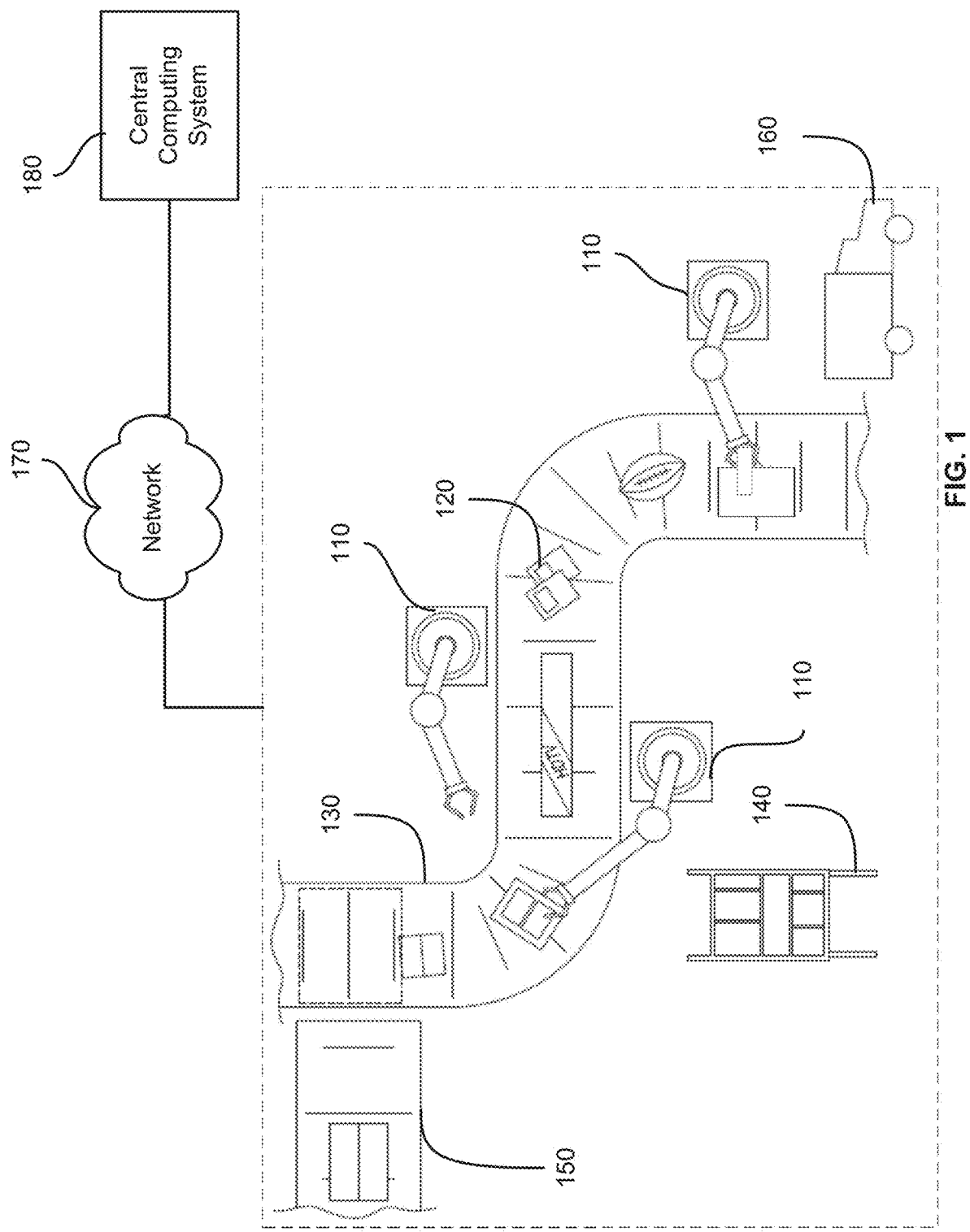
FIG. 1 illustrates an example of an inventory system including robot stations and a central station, according to a particular embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments herein are directed to, among other things, validating robotic manipulation events using a classifier. An action associated with an item is performed at least by controlling an operation of an end effector that manipulates the item or by controlling a robotic arm that moves the end effector. For example, the action can be a stow action, a place action, a pick-up action, and the like. The robotic arm includes one or more sensors that collect time-series data for the manipulation of the item by the end effector or movement of the end effector by the robotic arm. The sensors can include a force-torque sensor, a weight sensor, a pressure sensor, or any other sensor capable of generating time-series data. The time-series data is input to a classifier that is trained for state-based event classifications. In an example, the classifier includes one or more hidden Markov models (HMMs). Events can include a successful inventory action, an incorrect manipulation of the item, an incorrect drop of the item, a damage to the item, and a manipulation of multiple items. The classifier classifies the action as an event classification that corresponds to one of the events. The event classification is stored for subsequent analysis and updates, if needed, to the robotic arm.

To illustrate, consider an example of a robot with a robotic arm and a grasper in a fulfillment center. The robot includes a force-torque sensor that is disposed between the robotic arm and the grasper and that is configured to generate multi-dimensional time-series data corresponding to a manipulation of the item by the grasper or a movement of the grasper by the robotic arm. This data can indicate the forces and moments along the X, Y, and Z axes. When the grasper picks up an item and the robotic arm moves the grasper in a pick and place inventory action, the resulting time-series data from the force-torque sensor is input to an HMM. The HMM outputs a classification of whether the inventory was successful or whether an incorrect drop occurred. The output is stored in a memory of the robot and used subsequently for troubleshooting and/or for updating the HMM.

Embodiments of the present disclosure provide several technical advantages over conventional robotic manipulation validation systems. For instance, the classifier can be run on a central processing unit (CPU) of the robot and can be updated over time. So, updated edge computing may be possible. Because of the edge computing, the classifier can be run at real time or near real time. Because it is updatable, the classifier can be easily refined and improved. For example, new event classifications can be added and detected following the detection of an anomaly. Additionally, the system is easily scalable and deployable. In terms of scalability, new event classifications can be added and/or outdated event classifications can be removed. In addition, a relatively small amount of synthetic data (e.g., simulated data) can be used to train the classifier followed by fine tuning using production data (e.g., data measured upon actual item manipulations). The system is easily deployable because a central system can collect the production data and event classifications from the different HMMs, perform fine tuning as needed, and further deploy to additional robots. As a result, the overall throughput and resource usage may be improved.

In the interest of clarity of explanation, embodiments may be described herein in connection with an inventory system, inventory items (e.g., items associated with an inventory), and manipulations related to an inventory. However, the embodiments are not limited as such. Instead, the embodiments may similarly apply to any objects, whether inventoried or not, and to any system, whether related to inventorying objects or not. For example, the embodiments may similarly apply to a manufacturing system, supply chain distribution center, airport luggage system, or other systems using robot stations to perform various automated and, in some instances, autonomous operations.

Turning to FIG. 1, the figure illustrates an example inventory system configured to implement the above described techniques. In particular, the example inventory system may include multiple robot stations 110 in communication with a central computing system 180 over a network 170. The central computing system 180 may collect, from the robot stations 110, data about how items 120 may be manipulated and may to generate a collective knowledge about manipulations and propagate that knowledge to the robot stations 110.

Although FIG. 1 illustrates three robot stations 110, a smaller or larger number of robot stations (e.g., in the hundreds) may exist within the inventory management system. Some of the robot stations 110 may be stationary at specific locations. Yet some other of robot stations 110 may be mobile and may move between locations. The robot stations 110 may be configured to perform different tasks related to inventorying the items 120. These tasks may include manipulating the items 120. To manipulate an item, a robot station may include an appropriate robotic manipulator, such as one including a robotic arm and/or an end effector for the desired manipulation. A manipulation of an item may represent a set of actions applied to the item in association with an inventory task. For example, an item may be received from a source 150 external to the inventory system, such as from a manufacturing facility or a distribution facility. The item may arrive to the inventory system and may be delivered to a robot station by way of a conveyor belt 130, or some other delivery mechanism. The robot station may stow the item by, for example, grasping, moving, and releasing the item into a container. The container may be located in an inventory holder 140. Additionally or alternatively, the robot station or another robot station may grasp and move the container to the inventory holder 140. The robot station may additionally interact with a human. For example, the robot station may receive an item from a human, hand over an item to a human, or perform other robot-human interactions. Grasping, moving, and releasing the item may represent examples of manipulations applied to the item. Similarly, grasping and moving the container may represent examples of manipulations applied to the container. Conversely, the same or a different robot station may stow the item from inventory holder 140 in preparation for a delivery of the item to a destination. The respective robot station may pick the container, grasp and move the item from the container, package the item, and place the package on the conveyor belt 130. Picking, packaging, and placing may represent other examples of manipulations. Once on the conveyor belt 130 again, the package may be moved to a delivery vehicle 160.

Some or all of the tasks of the robot stations 110 may be managed by the central computing system 180. In an example, the central computing system 180 may represent a computer system configured to provide different inventory management functionalities. The computing system may include a physical computing resource, such as a computer server. Additionally or alternatively, the computer system may include a virtual computing resource (e.g., a computing cloud-based resource). Although FIG. 1 illustrates the central computing system 180 as a component separate from the robot stations 110, the central computing system 180 or functionalities thereof, may be integrated with a set of robot stations 110 or distributed among the robot stations 110. Further and although FIG. 1 illustrates that the central computing system 180 supports a single inventory system, the central computing system 180 may support a larger number of inventory systems. Conversely, a single inventory system may subscribe to and be supported from multiple central stations.

The central computing system 180 may be in communication with CPUs of the robot stations 110. Generally, a CPU of a robot station hosts a controller to control an inventory action performed by the robot station on an item. The controller additionally receives data generated by sensors of the robot station during the performance of the inventory action. The CPU may additionally include a classifier trained for state-based event classifications (e.g., a successful inventory action, an incorrect manipulation of the item, an incorrect drop of the item, a damage to the item, and a manipulation of multiple items). An event may correspond to a set of manipulations applied to the item as part of performing the inventory action. The classifier generates an output that classifies the action as an event classification based on a sequence of states detected for the manipulations. The controller can validate whether the robot station is performing as expected or not based on the event classification (e.g., if the inventory action is to pick and place the item and if the classifier indicates an item drop, the controller determines that the performance of the inventory action is invalid).

The sensor data may include raw data that are measurements of one or more manipulation parameters (e.g., type and amount of force, pressure, voltage, and/or current applied, orientation of an item, etc.). In an example, the sensor data is time-series data of raw data samples, each sample having a time stamp, and the time stamps collectively forming a time series. The sensor data can also be multi-dimensional (e.g., includes a first time-series data for a first manipulation parameter and a second time-series data for a second manipulation parameter). In this case, each dimension can correspond to raw data generated by the same or a different sensor at a particular sampling rate and having a particular sample length. The sampling rate need not be the same across the dimensions. Additionally or alternatively, the sample length need not be the same across the dimensions. For example, data samples along one dimension may have a sampling rate of "k" bits per second and a sample length of "l" bits, whereas data samples along a different dimension may have a sampling rate of "m" bits per second and a sample length of "n" bits. "k" may be different from "m" and/or "l" may be different from "n."

In an example, a ghost pick is an event that indicates an incorrect manipulation of an item, where a robotic station incorrectly determines that an item was picked when in fact it was not. However, incorrect manipulation is not limited as such and applies to any type of manipulation where a robotics station determine that the manipulation was correctly performed when in fact it was not.

In an example, amnesty is an event that indicates an incorrect drop of an item, where a robotic station successfully picks the item, but subsequently drops the item. However, incorrect drop is not limited as such and applies to any type of manipulation where a robotic station 1 determines the item was successfully picked and moved, when in fact it the movement failed.

In an example, robot-induced damage is an event that indicates a damage to an item, where a robotic station applies an incorrect amount of force to the item or manipulates the item in such a way to cause damage to the item. However, damage to the item is not limited as such and applies to any type of manipulation where damage occurs to the item.

In an example, multi-pick is an event that indicates manipulation of multiple items, where a robotic station picks more than one item when only one item is to be picked.

However, manipulation of multiple items is not limited as such and applies to any type of manipulation where multiple items are manipulated.

The network 170 may include a public data network (e.g., the Internet) or a private data network (e.g., an intranet or a virtual private network (VPN)), wireless or wired, and implementing different communication protocols (e.g., TCP/IP). In an example, the network 170 may not only connect the central computing system 180 and the robot stations 110, but may also interconnect the robot stations 110 themselves. As such, the robot stations 110 may be able to exchange sensor data and classifiers among themselves. This may be the case when, for instance, functionalities of the central computing system 180 may be distributed between some or all of the robot stations 110.

Hence, the robot stations 110 and the central computing system 180 may be networked by way of the network 170. Knowledge about event classifications may be generated, propagated, and updated over time. As such, a robot station may exploit knowledge generated based on sensor data of other robot stations.

The robot stations 110 of FIG. 1 may be examples of a robotic system. Generally, a robotic system may be a system that includes a set of robots and a set of controllers that control the robot set. The robotic system may be used to perform an action on an item (e.g., a physical object), where the performance may include manipulating the item. The action can be an inventory actions to manipulate the item for inventorying purposes (in, out, and/or through a facility).

Figure 2:
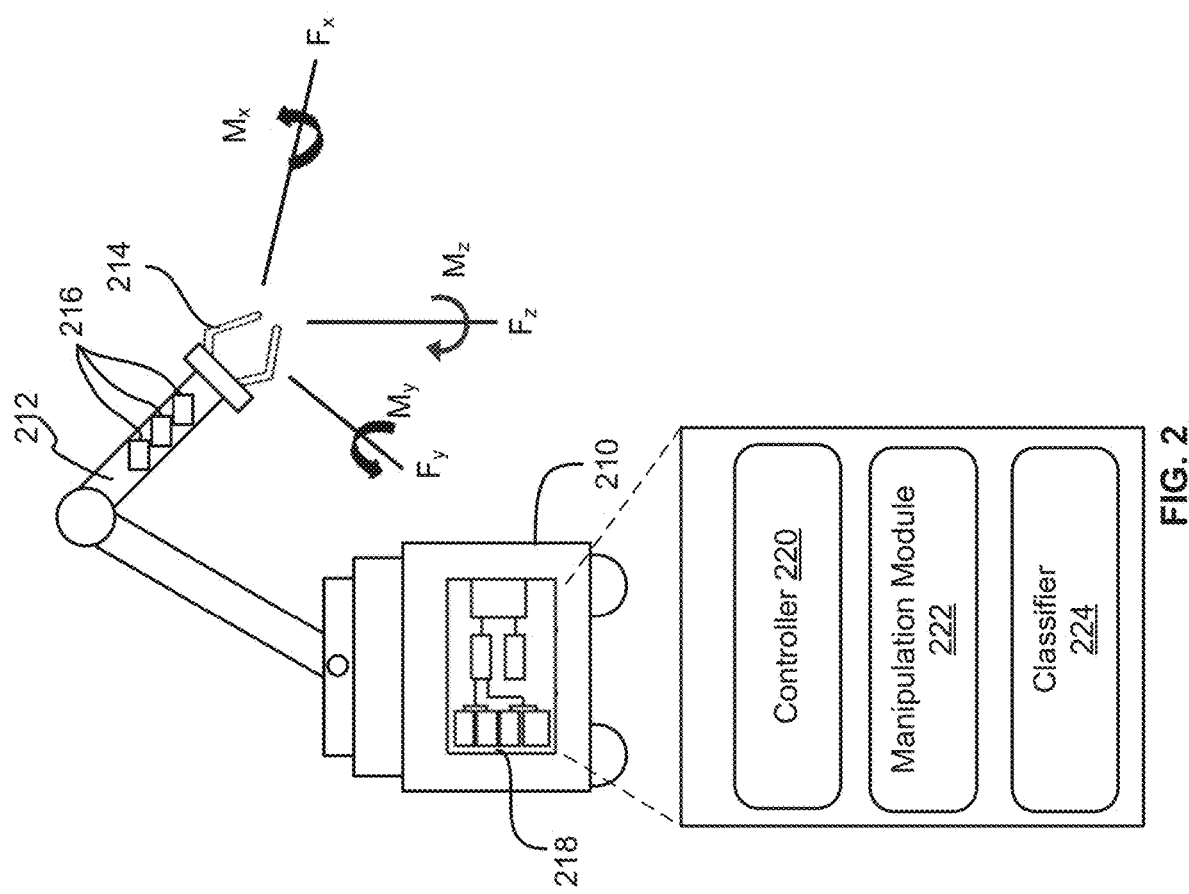
FIG. 2 illustrates example components of a robot station and a central station, according to a particular embodiment.

FIG. 2 further illustrates components of a robot station 210 as an example of a robotic system. Similarly to the robot stations 110 of FIG. 1, the robot station 210 may be in communication with a central computing system, such as the central computing system 180 in FIG. 1, over a network.

The robot station 210 may include a robotic arm 212 and an end effector 214. Although the description herein primarily refers to a robotic arm 212, any other mechatronic or robotic device may be used in lieu of or in addition to a robotic arm. The end effector 214 may be connected to an end of the robotic arm 212 and configured to manipulate an item. Any suitable end effector (or number or combination of end effectors) may be utilized, including, but not limited to, soft robotic effectors, vacuum effectors, electro-adhesion effectors, and mechanical or electromechanical effectors. Soft robotic end effectors may generally include flexible structures that may be manipulated between various orientations. The structures may include silicon bodies or other flexible material. Manipulation of the flexible material may be achieved through use of flexible actuators such as air muscles (e.g., contractile or extensional devices operated by pressurized air movement relative to filling or emptying a pneumatic bladder), electro-active polymers (e.g., polymers which change size or shape when stimulated by an electric field), or ferrofluids (e.g., fluids having suspended ferromagnetic particles capable of altering a size or shape of the fluid volume when subjected to a magnetic field). Vacuum end effectors may manipulate items using suction. Electro-adhesion end effectors can include an array of electrodes arranged along a flexible or rigid substrate capable of applying a charge (akin to static electricity) that can adhere an item to the substrate portions that are in contact with the item. Mechanical or electromechanical end effectors may include pinchers, claws, grippers, or other rigid components that may be actuated relative to one another for manipulating an item. Other end effectors may also be utilized to facilitate additional manipulation techniques, such as trays, scoops or other similar structures. For example, a magnetic or electromagnetic end effector may be useful for manipulating items having ferro-magnetic materials.

In an example, the robot station 210 may also include a set of sensors 216. The sensors 216 may be installed at different points of the robot station 210 including, for instance, at the robotic arm 212, the end effector 214, and/or between the robotic arm 212 and the end effector 214. The sensors 216 can be positioned at any joint of the robotic arm 212. The sensors 216 may be configured to sense parameters associated with an item manipulation. These parameters may be processed by a computer system 218 of the robot station 210 to classify the inventory action in a state-based event-classification.

Generally, the sensors 216 may include different types of sensors to determine attributes of an item to be manipulated. For example, the sensors can be for force sensing, torque sensing, tactile sensing, pressure sensing, voltage sensing, conductance sensing, ultrasonic sensing, x-ray sensing, or other sensing, such as to determine physical attributes of a detected item to be grasped or its surroundings, such as structural integrity, deformability, weight, surface characteristics (e.g., how slippery the item may be), or other physical attributes of a detected item. Some or all of the sensors 216 may generate multi-dimensional, time-series data. For instance, a force-torque sensor may generate six degree of freedom (6-DOF) time-series data. Further, the sensors 216 can be installed at different installation points of the robot station 216. For instance, a 6-DOF force-torque sensor can be installed at a joint between the end effector 214 and the robotic arm 212. In another example, multiple force-torque sensors can be installed, each of which is positioned at along a different axis of the joint between the end effector 214 and the robotic arm 212 and generates torque and force time-series data along the axis, such that the different force torque sensors collectively generate 6-DOF time-series data. In yet another example, an optical sensor can be installed in a body of the robot station 210, and a distance sensor can be installed in the robotics arm 212.

Additionally or alternatively, other sensors may be used. For example, imaging devices or optical sensors may be used to determine physical characteristics, such as size, shape, position, orientation, and/or surface characteristics (e.g., how porous and/or slippery the item is based on the surface appearance). Any suitable optical technology can be utilized, including, but not limited to, two-dimensional cameras, depth sensors, time of flight sensing (e.g., broadcasting a source of light and determining a time of reflection for each pixel to determine a distance from the sensor for each pixel to determine a three-dimensional array of data points representing a virtual model of the sensed item and environment), structured light sensing (e.g., projecting a known image from a light source, observing the image as distorted by variations in the surface of the detected item, and analyzing the distortions with respect to the projected image to determine positioning of the features that caused the distortion), stereo sensing (e.g., analyzing differences in images collected from multiple cameras arranged at known offsets from one another to generate a point cloud or digital model), active stereo sensing (e.g., projecting a pattern of light to improve precision of detection of features while using stereo sensing), any other optically-based methodology of observing light for generating a digital representation of a physical object, or any combination thereof.

The computer system 218 may host a controller 220. The controller 220 may be configured to specify an inventory action (e.g., pick, place, stow, rotate, etc.). For example, the controller 220 can specify an operation of the end effector

214 configured to manipulate the item, or an operation of a robotic arm 212 configured to move the end effector 214. The specified operation may be based on manipulation capabilities (e.g., what robotic arms and end effectors are installed at the robot station 210), usages of the robot station 210 (e.g., what tasks the robot station 210 may perform), and/or the items that the robot station 210 may manipulate.

The computer system 218 may additionally include a manipulation module 222 configured to control item manipulations to perform the inventory action specified by the controller 220. The manipulation module 222 controls operations of the robotic arm 212 and/or the end effector 214 and the sensing performed by the sensors 216. For example, the manipulation module 222 may use computer vision to identify the item and control loops to perform the item manipulations. Further, the manipulation module 222 may control which sensors generate data and the sampling rate of such data for a particular inventory action. In an example, time-series data of one or more of the sensors 216 includes first time series-data and second time-series data that has a different sampling rate than the first time-series data. For example, the time-series data can be generated by two sensors that sample at different sampling rates. In some examples, the first time-series data and the second time-series data are generated by a sensor 216 and correspond to different sensing parameters (e.g., multidimensional time-series data).

In an example, the computer system 218 also includes a classifier 224. The classifier 224 may be a model trained for state-based event classifications. In some examples, the classifier 224 can include a Markov model, and in one example, the Markov model includes a hidden Markov model (HMM). The classifier 224 receives time-series data generated by one or more of the sensors 216 and outputs an event classification from the state-based event classifications, where the event classification classifies the inventory action as a particular event (e.g., successful, ghost pick, amnesty, damage, multi-pick, anomaly, etc.). For example, the classifier 224 can generate an output that classifies the action as a successful inventory action based on processing the time-series data and determining the corresponding sequence of item manipulations indicates the action was performed successfully.

In an example, the classifier 224 receives time-series data from more than one sensor 216. The computer system 218 may additionally or alternatively include multiple classifiers, and each classifier 224 can be trained for a particular sensor and receives the time-series data of this particular sensor.

In an example, the controller 220 receives the output from the classifier 224 and stores the event classification of the inventory action. The controller 220 validates whether the robot station 210 is performing as expected. The controller 220 may transmit the output to a central computing system (e.g., central computing system 180 in FIG. 1) configured to update and fine-tune aspects of the robotic station 210 over time. For example, the central computing system may receive outputs from multiple robotic stations and fine-tune the robotic stations based on the outputs.

In an example, a feedback loop may exist between the classifier 224 and the controller 220 to control, in real-time, next inventory actions of the robot station 210 depending on the event classifications of previous inventory actions. For instance, the controller 220 controls a reactive action (e.g., a next inventory action) of the robot station 210 based on an event classification of a previous inventory action that the robot station 210 attempted to perform. The reactive action can be an additional item manipulation to be performed in response to determining a particular event has occurred. For example, the controller 220 receives an output of the classifier 224 indicating the event was a ghost pick. The controller 220 can specify the reactive action as retrying to pick the item. Accordingly, the manipulation module 222 can control the robotic arm 212 retrying to pick the item.

Figure 3:
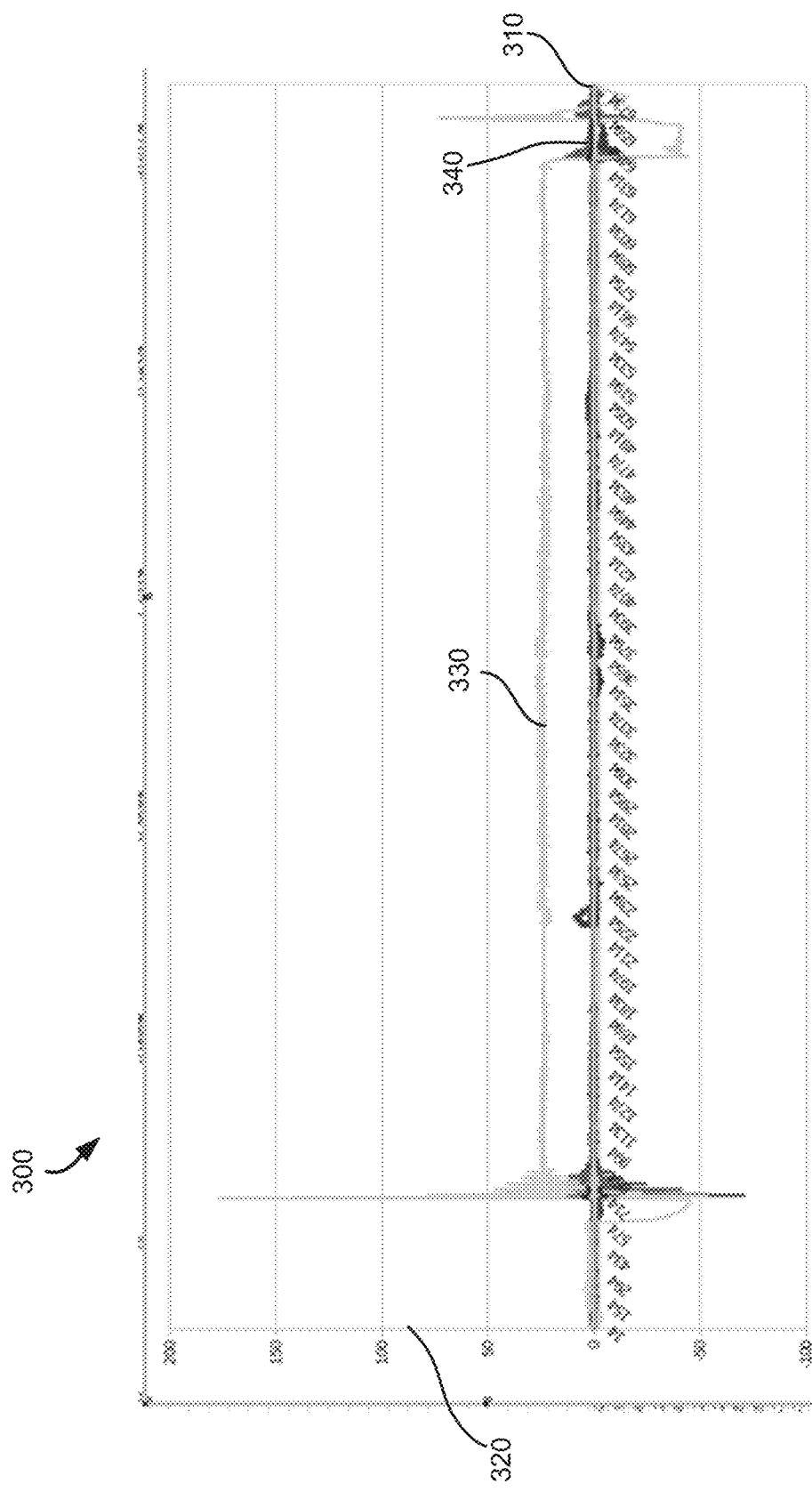
FIG. 3 illustrates an example of a graph of time-series data generated by a sensor of a robotic arm.

FIG. 3 illustrates an example of graph 300 of time-series data generated by a sensor of a robotic arm. The sensor can be a force-torque sensor coupled with an end effector and a robotic arm. The force-torque sensor can generate six degree of freedom (e.g., multi-dimensional) time-series data. For the graph 300, an x-axis 310 represents time and a y-axis 320 represents force (N). First data 330 represents a first dimension of the time-series data generated by the force-torque sensor during an item manipulation and second data 340 represents a second dimension of the time-series data generated by the force-torque sensor during the item manipulation. The first data 330 and second data 340 may have different sampling rates or different sample lengths. While the graph 300 shows two dimensions, other examples may include up to six dimensions in the case of a force-torque sensor (e.g., three forces along the X, Y, and Z axes, and the torque per axis).

Figure 4:
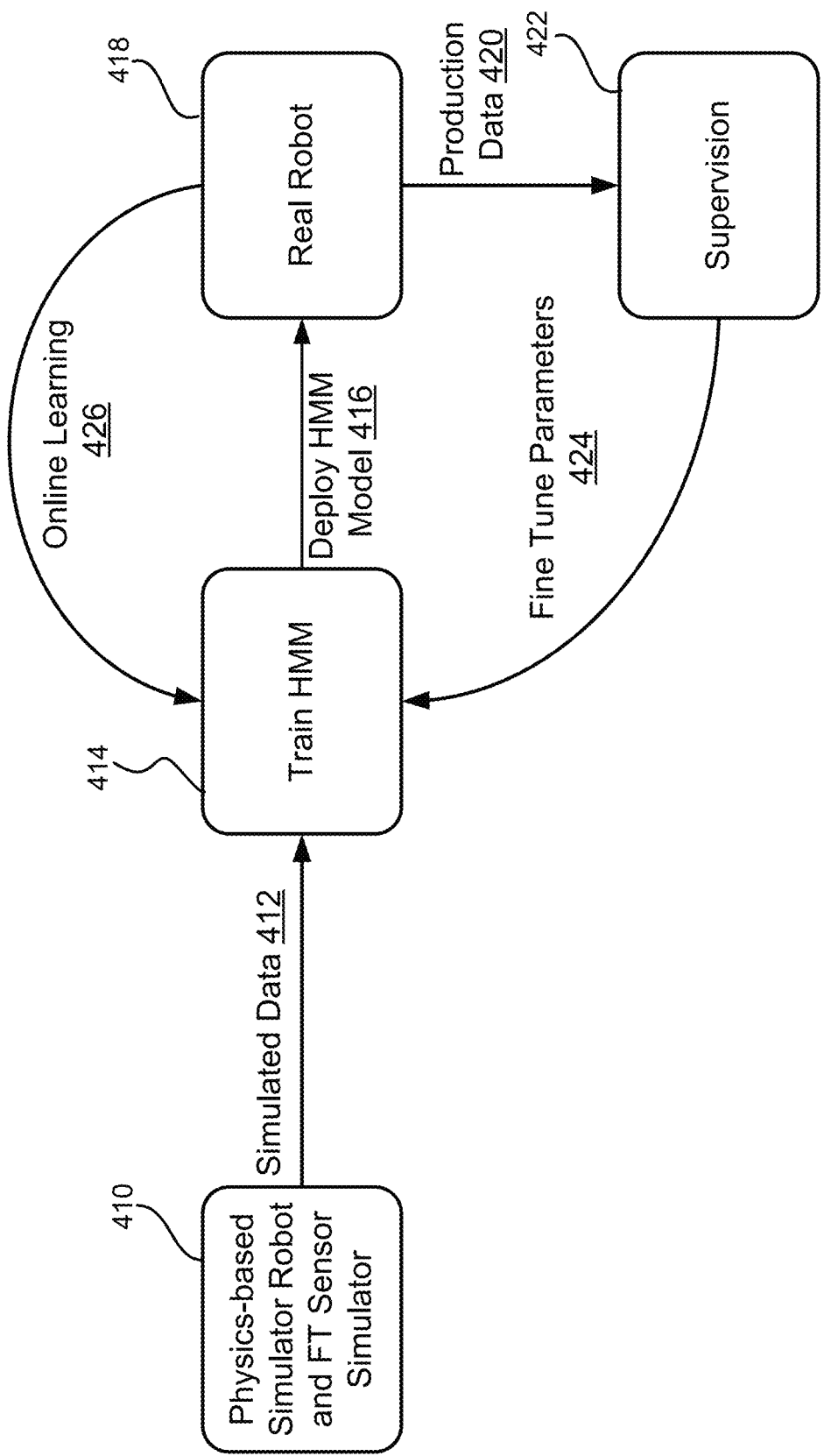
FIG. 4 illustrates an example of a process for training and implementing a classifier for validating a robotic manipulation event.

FIG. 4 illustrates an example of a process for training and implementing a classifier for validating a robotic manipulation event. Different classifiers may be trained for each sensor of a robotic system. Alternatively, a single classifier may be trained for multiple sensors. Further, a classifier can include multiple hidden Markov models, each of which is trained for a different event classification. In the illustration of FIG. 4, a single hidden Markov model is shown in the interest of clarity of explanation. However, the training and implementation of other hidden Markov models are similarly performed.

In an example, simulations 410 are used to generate simulated data 412 usable in the training of the hidden Markov model. For example, the simulations 410 can model a physics-based simulator robot and a sensor (e.g., force-torque sensor simulator), process different simulated inventory actions through the model, and measure the resulting simulated data 412. The simulated data 412 can be time-series data corresponding to simulated inventory actions. Each simulated inventory action may have a known event classification (e.g., successful, simulated ghost pick, simulated amnesty, and the like). As such, the simulated data 412 can be divided into subsets, each of which corresponding to a known event classification. The simulated data 412 can also be referred to as synthetic data.

In an example, simulated data 412 from the simulations 410 is used to train a hidden Markov models 414 of the classifier. This hidden Markov model can be trained for a particular event classification (e.g., to classify whether an inventory action is a ghost pick or not).

To train the hidden Markov model for the event classification, the simulated data 412 can be separated into a first training data set and a second training data set. The first training data set is a subset of the simulated data 412, where this subset corresponds to the event classification for which the hidden Markov model is trained (e.g., ghost pick). The second training data set corresponds to the remaining subset of the simulated data 412, where the remaining subset corresponds to the remaining event classifications (e.g., success, amnesty, etc. but not ghost pick). A first log-likelihood distribution is generated for the first training data set and a second log-likelihood distribution is generated for the second training data set. A threshold for classifying an event as the event classification may be determined from the log-likelihood distributions. For example, the threshold may be a log-likelihood value where the two log-likelihood distributions intersect.

In an example, once the hidden Markov model is trained, the hidden Markov model is deployed 416. For example, the hidden Markov model may be flashed to a CPU of a real robot 418 of the robotic system. The hidden Markov model may alternatively run on an embedded device (e.g., Jetson Nano or Raspberry Pi or any other hardware) of the real robot 418. The real robot 418 includes sensors for generating production data 420 during manipulations of items.

In an example, supervision 422 is performed (e.g., by a computer system or a human) on the production data 420. The supervision 422 may identify adjustments for the classifier. For example, the classifier (e.g., collection of hidden Markov mode) may output event classifications corresponding to actually performed (e.g., rather than simulated) inventory actions. These event classifications may be compared to the actual performance. The results of the comparisons may indicate an accuracy of the classifier. Further, the classifier may output an anomaly (e.g., an inventory action that could not be classified in one of the event classifications). Anomalies can be tracked over time. The accuracy and/or anomalies can be used to fine-tune 424 parameters of the classifier. For instance, if the accuracy drops below an accuracy threshold, some or all of the production data 420 can be used to further train one or more of the hidden Markov models. If the rate of anomalies exceeds a rate threshold, a new event classification may be defined and an additional hidden Markov model may be trained for the new event classification, where this training can use some of the production data 412 where the anomalies were manifested.

In an example, the real robot 418 is also continuously trained through online learning 426. A computer system in communication with the robotic system can collect sensor data, production data, and event classifications from multiple robots, execute the online learning 426 to update the hidden Markov models, and push the resulting updates to the robots. The online learning 426 may additionally be based on data from other robotic systems performing inventory actions and state-based event classifications.

Figure 5:
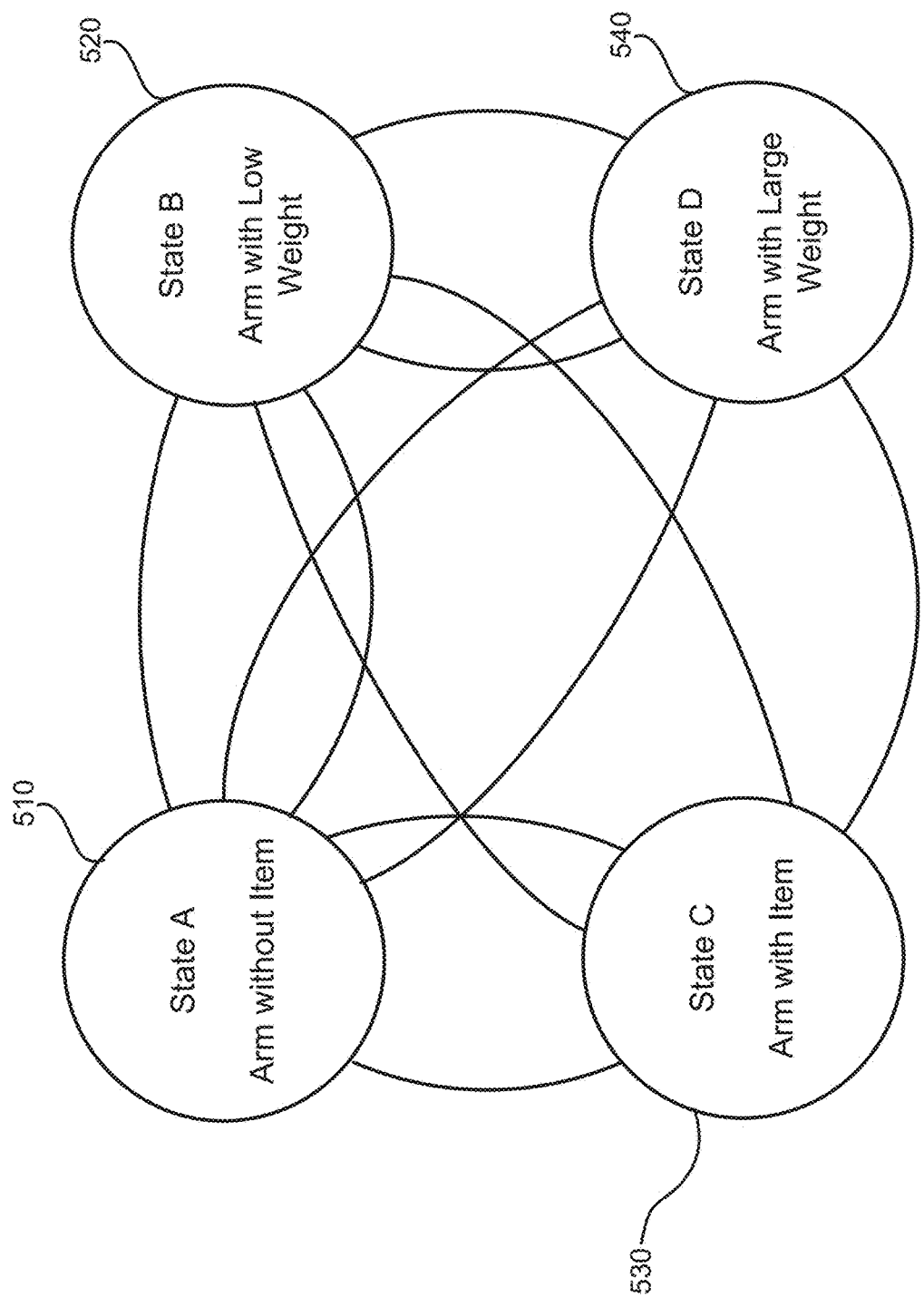
FIG. 5 illustrates an example of a state-based classifier.

FIG. 5 illustrates an example of a state-based classifier, such as one implementing a Markov model. In FIG. 5, the states include state A 510, state B 520, state C 530, and state D 540. State A 510 can correspond to a robotic arm without an item, state B 520 can correspond to a robotic arm with a low weight, state C 530 can correspond to a robotic arm with an item, and state D 540 can correspond to a robotic arm with a large weight. Each states is connected to the remaining three states. The weight of a connection between two states indicates a likelihood of transition from one state to the other state. Although not shown, a connection from the state to itself exists and can have a likelihood (e.g., the likelihood to remain in the state and not transition to another one). When the model is one state at one point in time, it is possible for the model to transition to any of the other three states or to remain in its current state at the next point in time. The connection that has the highest likelihood is selected and indicates the next state at the next point in time. Of course, in the case of a hidden Markov model, the states may not be predefined, the model itself learns the different states, and the states may remain hidden. The Markov model (hidden or otherwise) can classify an action into an event classification based on a sequence of transitions between the states.

While specific states are shown in FIG. 5, these states are for illustrative purposes only. Time-series data is received.

Each data sample corresponds to a point in time. The model starts with an initial state and transitions between states are detected at the different point in times given the corresponding data samples. The sequence of transitions indicates a series of states from which an event classification can be deducted. For instance, the sequence of transitions indicates the following series of states: A, D, C, C, C, C, B, A (where "A," "B," "C," and "D" correspond to state A 510, state B 520, state C 530, and state D 540, respectively). In this case, the event classification is a successful manipulation because the robotic arm started without the item, then the item was loaded (large weight), the arm retained the item for some time, then the item was unloaded (low weight), and finally the item was no longer retained. In another illustration, the sequence of transitions indicates the following series of states: A, D, C, A, A, A, A. This sequence correspond to an item drop following a short loading of the item.

Figure 6:
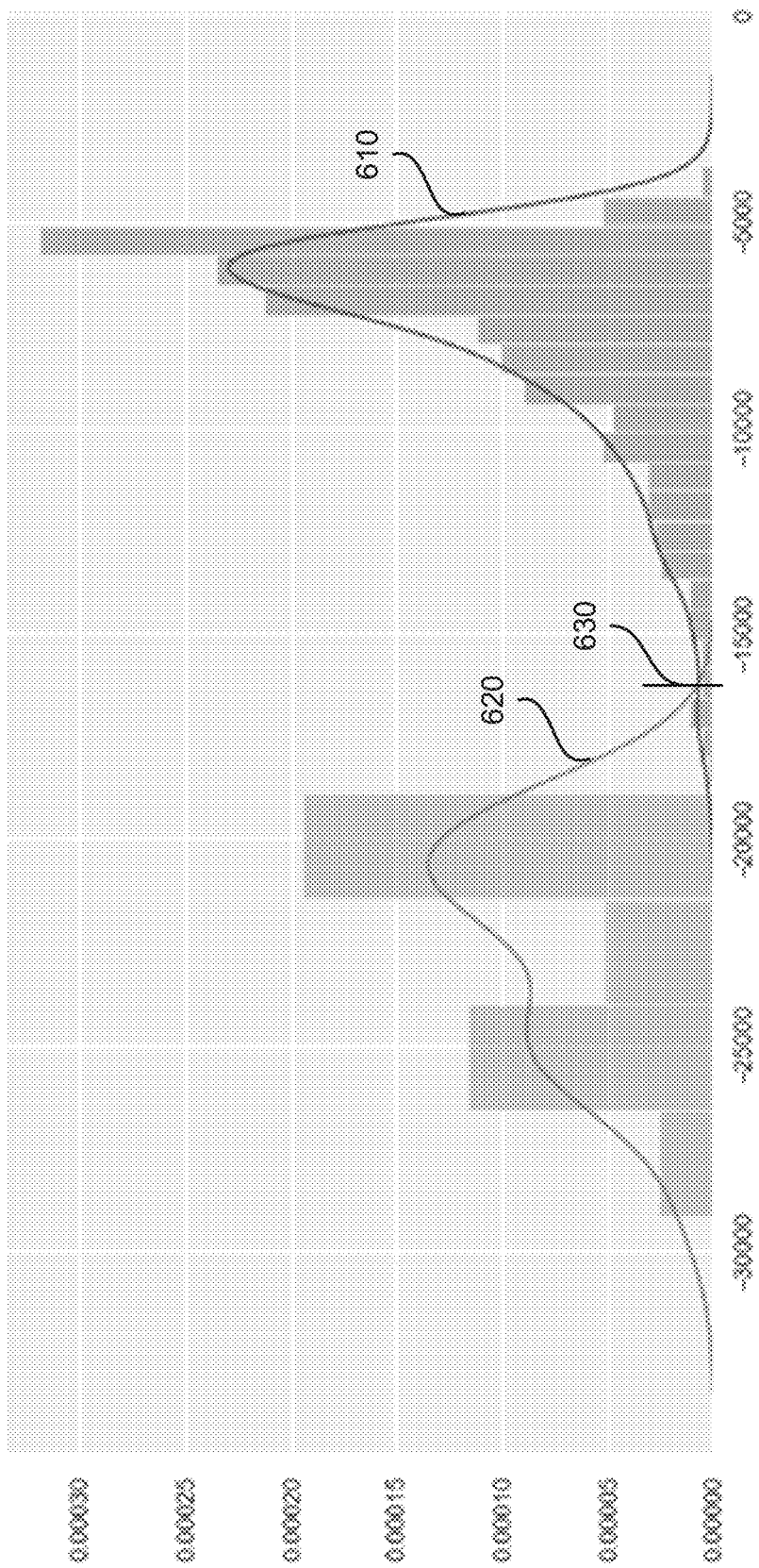
FIG. 6 illustrates an example of log-likelihood distributions for an event classification.

FIG. 6 illustrates an example of log-likelihood distributions for an event classification A log-likelihood distribution corresponds to a likelihood of an observation sequence for a given a state sequence. For example, for an observation sequence $X=\{x_1, x_2, \ldots x_T\}$ and a state sequence $Q=\{q_1, \ldots q_r\}$ determined from a hidden Markov model with parameters $\Theta$, the likelihood X along the path Q can be defined as:

$$p(X|Q, \Theta) = \prod_{i=1}^{T} p(x_i|q_i, \Theta) = b_1(x_1) * b_2(x_2) \ldots b_T(x_T)$$

During the training of the hidden Markov model for a particular event classification, a log-likelihood threshold 630 can be derived based on log-likelihood distributions may be used during training to identify a threshold 630. For example, a first log-likelihood distribution 610 can be generated based on simulated or production time-series data for the particular event classification (e.g., damage to the item). A second log-likelihood distribution 620 can be generated based on simulated or production time-series data for other event classifications (e.g., a successful inventory action, an incorrect manipulation of the item, an incorrect drop of the item, and a manipulation of multiple items). The log-likelihood threshold 630 is determined to be a point of intersection between the first log-likelihood distribution 610 and the second log-likelihood distribution 620.

Once trained, the hidden Markov model can determine the log-likelihood for time-series data received from one or more sensors during an inventory action. If the log-likelihood is greater than the log-likelihood threshold, the inventory action is classified to belong to the event classification. Otherwise, the inventory action does not correspond to the event classification and another hidden Markov model is used to further classify the inventory action.

Figure 7:
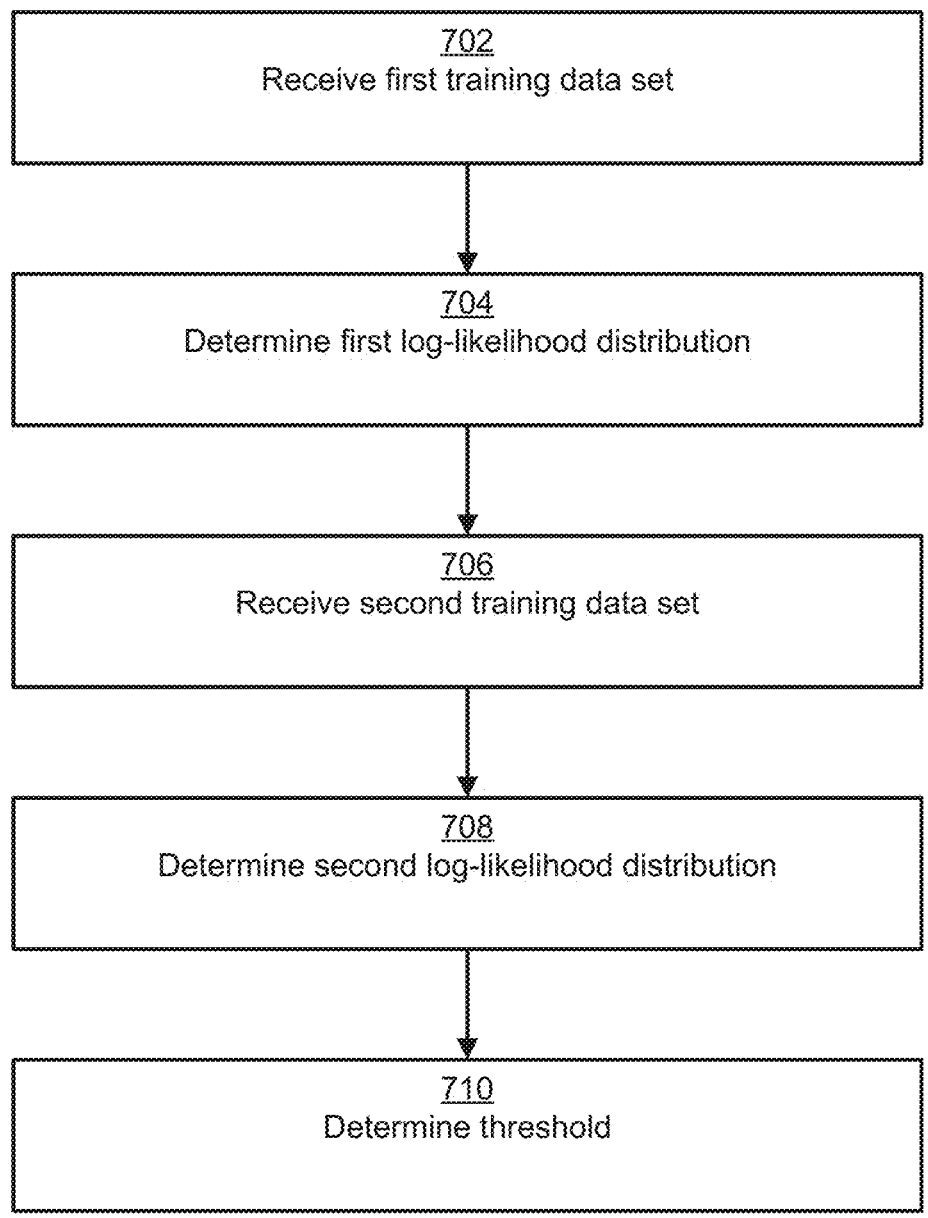
FIG. 7 illustrates an example of a flow for training a state-based model of a classifier.
Figure 8:
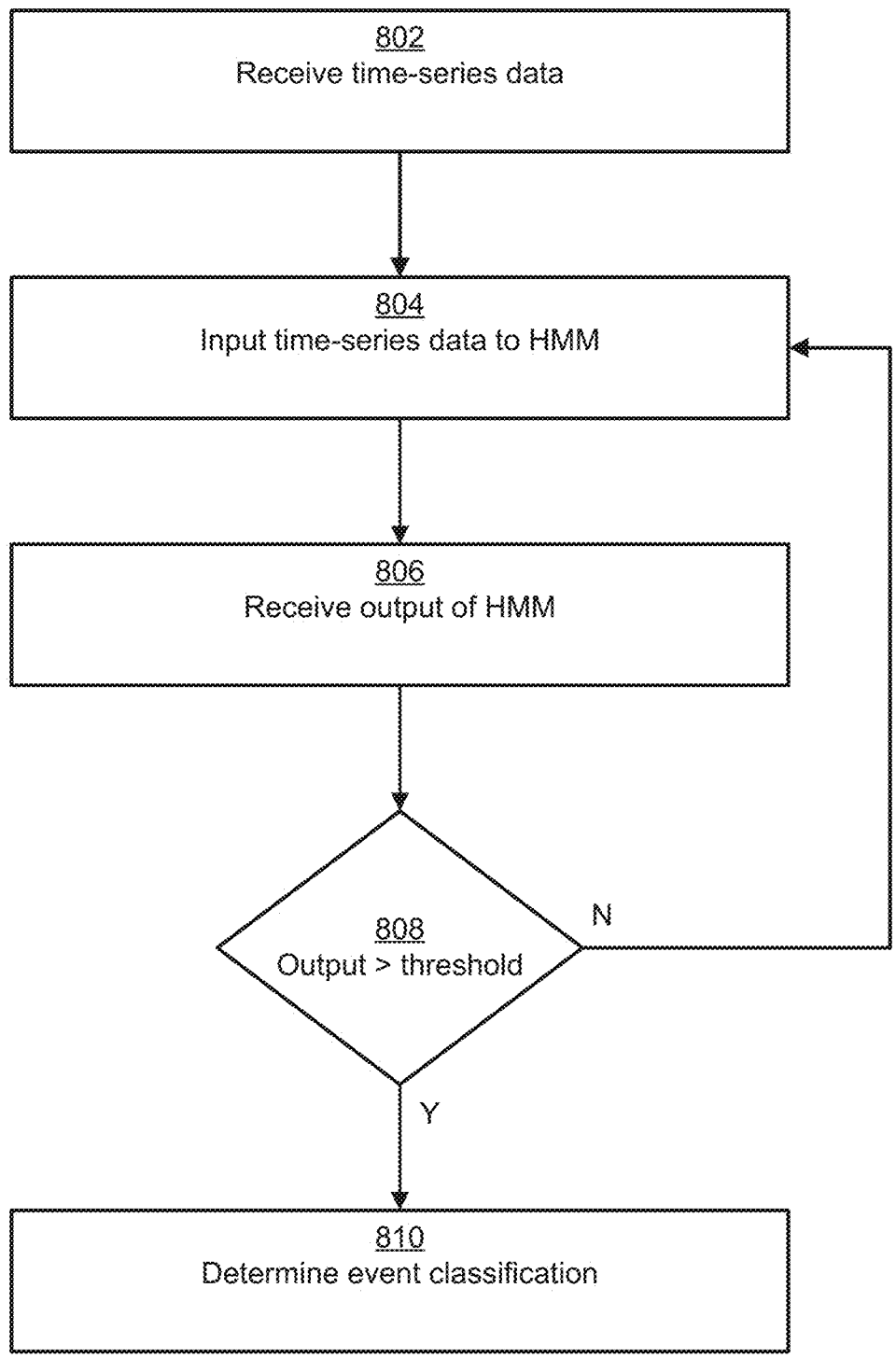
FIG. 8 illustrates an example of a flow for using a hidden Markov model for validating a robotic manipulation event.
Figure 9:
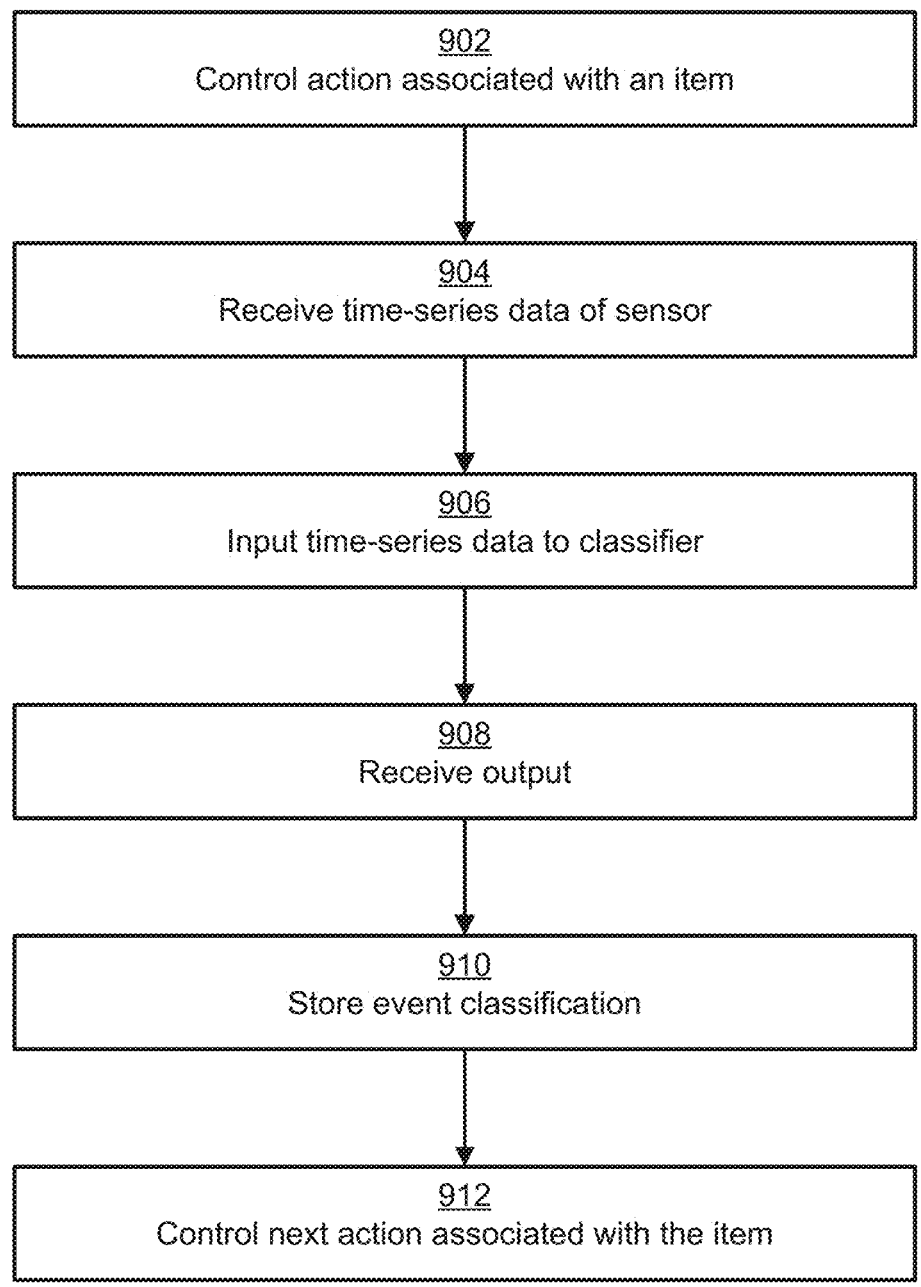
FIG. 9 illustrates an example of a flow for using a classifier to validate a robotic manipulation event.

FIGS. 7-9 illustrate processes for validating an inventory action. As described below, operations of the flows can be performed by a computer system, such as the computer system 218. Some or all of the instructions for performing the operations can be implemented as hardware circuitry and/or stored as computer-readable instructions on a non-transitory computer-readable medium of the computer system. As implemented, the instructions represent modules that include circuitry or code executable by processor(s) of the computer system. The use of such instructions configures the computer system to perform the specific operations described herein. Each circuitry or code in combination with the relevant processor(s) represent a means for performing a respective operation(s). While the operations are illustrated in a particular order, it should be understood that no particular order is necessary and that one or more operations may be omitted, skipped, performed in parallel, and/or reordered.

FIG. 7 illustrates an example of a flow for training a state-based model of a classifier. In an example, the state-based model is a hidden Markov model that is trained for a particular event classification. As illustrated, the flow includes operation 702, where the computer system receives a first training data set. The first training data set is time-series data that corresponds to the particular event classification. For instance, this event classification is a ghost pick. The first training data set includes time-series data corresponding to simulated and/or production item manipulations that were in effect ghost picks.

In an example, the flow includes operation 704, where the computer system determines a first log-likelihood distribution. The first log-likelihood distribution corresponds to the first training data set. The equation described in connection with FIG. 6 can be used to determine the first log-likelihood distribution.

In an example, the flow includes operation 706, where the computer system receives a second training data set. The second training data set is time-series data that corresponds to the remaining event classifications. For instance, these event classification include success, amnesty, and the like, but not a ghost pick. The second training data set includes time-series data corresponding to simulated and/or production item manipulations that were in effect successful, amnesty, and the like but not ghost picks.

In an example, the flow includes operation 708, where the computer system determines a second log-likelihood distribution. The second log-likelihood distribution corresponds to the second training data set. The equation described in connection with FIG. 6 can be used to determine the second log-likelihood distribution.

In an example, the flow includes operation 710, where the computer system determines a log-likelihood threshold. The t log-likelihood threshold is defined based at least in part on log-likelihood distributions associated with the state-based event classifications. For example, the log-likelihood threshold can be a value corresponding to where the first log-likelihood distribution intersects with the second log-likelihood distribution.

FIG. 8 illustrates an example of a flow for using a hidden Markov model for validating a robotic manipulation event. In an example, the flow includes operation 802, where the computer system receives time-series data. The time-series data can be multi-dimensional and may be received from one or more sensors of a robotic system and can indicate measurements of parameters related to manipulating an item by an end effector and/or a robotic arm as part of performing an inventory action on the item. For example, the time-series data may be six degree of freedom time-series data generated by a force-torque sensor disposed between the end effector and the robotic arm.

In an example, the flow includes operation 804, where the computer system inputs the time-series data to a hidden Markov model. The hidden Markov model is part of a classifier trained for a state-based event classification (e.g., a ghost pick as in the illustrative example of FIG. 7).

In an example, the flow includes operation 806, where the computer system receives an output of the hidden Markov model. The output is based at least in part on the time-series data.

The output may include a log-likelihood value associated with the state-based event classification. For example, the output can be a log-likelihood of the inventory action being a ghost pick.

In an example, the flow includes operation 808, where the computer system determines whether the output is greater than a log-likelihood threshold. If so, the flow proceeds to operation 810. Otherwise, the time-series data is input into another hidden Markov model trained for another event classification (e.g., manipulation of multiple items).

In an example, the flow includes operation 810, where the computer system determines an event classification. If the output is greater than the log-likelihood threshold, the computer system determines that the inventory action is classified in the event classification. For example, the computer system determines that the inventory action is a ghost pick.

FIG. 9 illustrates an example of a flow for using a classifier to validate a robotic manipulation event. In an example, the flow includes operation 902, where the computer system controls an action associated with an item. The computer system controls one or more of an operation of an end effector configured to manipulate the item or an operation of a robotic arm configured to move the end effector.

In an example, the flow includes operation 904, where the computer system receives time-series data of a sensor. The time-series data can be multi-dimensional and may be received from one or more sensors coupled to the robotic arm and the end effector. The sensors can be a force-torque sensor, distance sensor, pressure sensor weight sensor, and the like.

In an example, the flow includes operation 906, where the computer system inputs the time-series data to a classifier. The classifier is trained for state-based event classifications. The time-series data is input to a hidden Markov model of the classifier that is trained for an event classification (e.g., one of a successful inventory action, an incorrect manipulation of the item, an incorrect drop of the item, a damage to the item, and a manipulation of multiple items). The time-series data can be input in real-time.

In an example, the flow includes operation 908, where the computer system receives an output. The output is based at least in part on the time-series data and can be received in real-time. The output classifies the action in an event classification from the state-based event classifications.

In an example, the flow includes operation 910, where the computer system stores the event classification. The computer system can use the stored event classification to update the classifier to include an additional state-based classification. The computer system may additionally maintain a log of event classifications and fine-tune the robotic system based on the log.

In an example, the flow includes operation 912, where the computer system controls a next action (e.g., a reactive action) associated with the item. The next action is based on the event classification. For example, if the computer system classifies the event as an incorrect drop of the item, the computer system can control a next action of picking the item up and continuing the original action.

The various embodiments can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, and/or any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based at least in part on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A robotic system, comprising:
an end effector configured to manipulate an item;
a robotic arm attached with the end effector and configured to move the end effector;
a set of sensors configured to generate multi-dimensional time-series data corresponding to at least one of: a manipulation of the item by the end effector or a movement of the end effector by the robotic arm; and
a computer system comprising one or more processors and one or more memories, the one or more memories storing instructions that, upon execution by the one or more processors, configure the computer system to:
control an inventory action associated with the item by at least controlling an operation of the end effector corresponding to the manipulation of the item and an operation of the robotic arm corresponding to the movement of the end effector;
receive the multi-dimensional time-series data of the set of sensors;
input the multi-dimensional time-series data to a classifier of the computer system, the classifier trained for state-based event classifications;
receive, from the classifier and based at least in part on processing the multi-dimensional time-series data across a plurality of states of the robotic arm and on a plurality of transition likelihoods, an output that classifies the inventory action in an event classification from the state-based event classification, wherein each of the plurality of transition likelihoods corresponds to a likelihood of a transition between two of the plurality of states, the robotic arm is configured to perform a different manipulation of the item specific to each one of the plurality of states; and
store the event classification of the inventory action.

2. The robotic system of claim 1, wherein the event classification indicates a first event and is associated with first simulated multi-dimensional time-series data, wherein the first simulated multi-dimensional time-series data is generated for the first event based at least in part on simulated end effector operations and simulated robotic arm operations, and wherein the classifier is trained based at least in part on the first simulated multi-dimensional time-series data and second simulated multi-dimensional time-series data that is generated for other events.

3. The robotic system of claim 1, wherein the set of sensors comprises a force-torque sensor coupled with the end effector and the robotic arm, wherein the force-torque sensor generates six degree of freedom (6 DOF) time-series data, and wherein the multi-dimensional time-series data comprises the 6 DOF time-series data.

4. The robotic system of claim 1, wherein each one of the state-based event classifications corresponds to a different one of a plurality of events, wherein the plurality of events comprises a successful inventory action, an incorrect manipulation of the item, an incorrect drop of the item, a damage to the item, and a manipulation of multiple items.

5. A method implemented by a computer system, the method comprising:
controlling an action of a robotic system, the action associated with a manipulation of an item by the robotic system;
receiving time-series data of a sensor, the time-series data corresponding to the manipulation of the item by the robotic system;
inputting the time-series data to a classifier trained for state-based event classifications;
receiving, from the classifier and based at least in part on processing the time-series data across a plurality of states of the robotic system and on a plurality of transition likelihoods, an output that classifies the action in an event classification from the state-based event classifications, wherein each of the plurality of transition likelihoods corresponds to a likelihood of a transition between two of the plurality of states, the robotic system is configured to perform a different manipulation of the item specific to each one of the plurality of states; and
storing the event classification of the action.

6. The method of claim 5, wherein inputting the time-series data comprises inputting the time-series data to a hidden Markov model (HMM) of the classifier, wherein the HMM is trained for the event classification.

7. The method of claim 6, wherein the HMM is trained based at least in part on a first training data set of time-series data that corresponds to an event indicated by the event classification and a second training data set of time-series data that corresponds to events indicated by remaining ones of the state-based event classifications.

8. The method of claim 7, wherein the HMM is trained further based at least in part on a first log-likelihood distribution that corresponds to the first training data set, a second log-likelihood distribution that corresponds to the second training data set.

9. The method of claim 6, wherein receiving the output comprises receiving an output of the HMM that is generated based at least in part on a threshold, wherein the threshold is defined based at least in part on log-likelihood distributions associated with the state-based event classifications.

10. The method of claim 5, further comprising:
updating the classifier to include an additional state-based event classification, wherein the classifier is updated based at least in part on a determination of an event classification anomaly, a type of inventory actions, or a type of end effectors.

11. The method of claim 5, further comprising:
controlling a next action of the robotic system based at least in part on the event classification, wherein the next action is associated with an additional manipulation of the item by the robotic system.

12. A computer system comprising:
one or more processors; and
one or more memories, the one or more memories storing instructions that, upon execution by the one or more processors, configure the computer system to:
   control an action of a robotic system, the action associated with a manipulation of an item by the robotic system;
   receive time-series data of a sensor, the time-series data corresponding to the manipulation of the item by the robotic system;
   input the time-series data to a classifier trained for state-based event classifications;
   receive, from the classifier and based at least in part on processing the time-series data across a plurality of states of the robotic system and on a plurality of transition likelihoods, an output that classifies the action in an event classification from the state-based event classifications, wherein each of the plurality of transition likelihoods corresponds to a likelihood of a transition between two of the plurality of states, the robotic system is configured to perform a different manipulation of the item specific to each one of the plurality of states; and
   store the event classification of the action.

13. The computer system of claim 12, wherein the time-series data comprises first time-series data and second time-series data that has a different sampling rate or a different sample length than the first time-series data.

14. The computer system of claim 12, wherein the time-series data comprises first time-series data and second time-series data that are input to the classifier.

15. The computer system of claim 14, wherein the time-series data and second time-series data are generated by the sensor and correspond to different sensing parameters.

16. The computer system of claim 12, wherein the one or more memories store additional instructions that, upon execution by the one or more processors, further configure the computer system to:
   receive additional time-series data of a different sensor, the additional time-series data corresponding to one or more of the manipulation of the item by an end effector of the robotic system or a movement of the end effector by a robotic arm of the robotic system; and
   input the additional time-series data to a classifier trained for state-based event classifications, wherein the output is received further based at least in part on the additional time-series data.

17. The computer system of claim 12, wherein the classifier comprises a plurality of hidden Markov models (HMMs), and wherein the time-series data is input to the plurality of HMMs.

18. The computer system of claim 12, wherein the one or more memories store additional instructions that, upon execution by the one or more processors, further configure the computer system to:
   validate the action based at least in part on the event classification.

19. The computer system of claim 12, wherein a first state of the two of the plurality of states corresponds to the robotic system holding the item, wherein a second state of the two of the plurality of states corresponds to the robotic system not holding the item, and wherein the likelihood corresponds to the transition between holding the item to not holding the item.

20. The computer system of claim 12, wherein the output is generated further based at least in part on a likelihood of remaining in a current state out of the two of the plurality of states.

* * * * *